US012196147B2

(12) United States Patent
Krishnamurthy et al.

(10) Patent No.: US 12,196,147 B2
(45) Date of Patent: Jan. 14, 2025

(54) ENGINE MALFUNCTION DETERMINATION SYSTEM

(71) Applicant: Nissan Motor Co., Ltd., Yokohama (JP)

(72) Inventors: Vikram Krishnamurthy, Marietta, GA (US); Wenying Li, Farmington Hills, MI (US); Yasuhiro Tanaka, Farmington Hills, MI (US); Toru Takagi, Farmington Hills, MI (US); Shota Yamazaki, Farmington Hills, MI (US)

(73) Assignees: Nissan North America, Inc., Franklin, TN (US); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/958,239

(22) Filed: Sep. 30, 2022

(65) Prior Publication Data

US 2024/0110533 A1 Apr. 4, 2024

(51) Int. Cl.
*F02D 41/14* (2006.01)
*F02D 41/22* (2006.01)
*F02M 25/08* (2006.01)

(52) U.S. Cl.
CPC ......... *F02D 41/22* (2013.01); *F02D 41/1401* (2013.01); *F02D 41/1454* (2013.01); *F02M 25/0809* (2013.01); *F02D 2041/1412* (2013.01); *F02D 2041/228* (2013.01); *F02D 2200/101* (2013.01)

(58) Field of Classification Search
CPC ................. F02D 41/1495; F02D 41/22; F02D 2041/228; F02M 25/0809
USPC ... 701/29.1, 31.4, 31.5, 31.6, 31.9, 107, 114
See application file for complete search history.

(56) References Cited

U.S. PATENT DOCUMENTS 3,777,559 A * 12/1973 Rennick .................. F02P 17/02 324/392
4,133,205 A * 1/1979 Hulls .................... G01M 15/12 73/114.76
4,408,289 A * 10/1983 Boning .................. G01R 23/15 327/31
5,116,342 A * 5/1992 Schmidt .................. F02P 17/02 73/114.49

(Continued)

FOREIGN PATENT DOCUMENTS

| | | | |
|---|---|---|---|
| JP | 2005-188501 | A | 7/2005 |
| JP | 2009-146086 | A | 7/2009 |
| KR | 101683242 | B1 | 12/2016 |

*Primary Examiner* — Erick R Solis
(74) *Attorney, Agent, or Firm* — Global IP Counselors, LLP

(57) ABSTRACT

An engine malfunction determination system includes a vehicle engine, an engine sensor system, an engine control module and an electronic display device. The engine sensor system has at least one sensor configured to detect an operation condition of the vehicle engine. The engine control module is in electrical communication with the sensor system to receive a detection signal from the engine sensor system regarding the operation condition of the vehicle engine. The engine control module is programmed to determine an anomaly in the detection signal. The electronic display device is programmed to display an indication of engine malfunction when the engine control module determines that the anomaly in the detection signal exceeds a predetermined threshold.

17 Claims, 13 Drawing Sheets

(56) References Cited

U.S. PATENT DOCUMENTS

| | | | | | |
|---|---|---|---|---|---|
| 5,157,610 | A * | 10/1992 | Asano | G07C 5/008 | 73/114.61 |
| 6,868,325 | B2 * | 3/2005 | Menon | G05B 23/0254 | 703/2 |
| 7,962,271 | B1 * | 6/2011 | Thompson | G01M 15/04 | 702/182 |
| 8,924,071 | B2 | 12/2014 | Stanek et al. | | |
| 11,620,863 | B2 * | 4/2023 | Davidson | G07C 5/008 | 701/31.9 |
| 2003/0020642 | A1 * | 1/2003 | Ely | H02P 6/16 | 341/111 |
| 2006/0025966 | A1 | 2/2006 | Kanamaru | | |
| 2006/0129307 | A1 | 6/2006 | Yasui | | |
| 2013/0024066 | A1 * | 1/2013 | Geilen | F02D 41/22 | 701/29.6 |
| 2013/0297192 | A1 * | 11/2013 | Imeroski | F02D 41/22 | 701/112 |
| 2014/0070753 | A1 * | 3/2014 | Concannon | G01M 15/05 | 73/114.16 |
| 2014/0130785 | A1 * | 5/2014 | Levijoki | F02D 41/1495 | 123/703 |
| 2014/0288780 | A1 * | 9/2014 | Berndt | B60R 21/0173 | 701/45 |
| 2016/0201590 | A1 * | 7/2016 | Ouchida | G05B 13/026 | 701/31.5 |
| 2020/0284615 | A1 * | 9/2020 | Hammerschmidt | G01B 7/30 | |
| 2021/0149049 | A1 * | 5/2021 | Luo | G01S 17/26 | |
| 2022/0166307 | A1 * | 5/2022 | Wrathall | H02M 1/4225 | |
| 2022/0404601 | A1 * | 12/2022 | Loterie | G02B 21/14 | |

* cited by examiner

ENGINE MALFUNCTION DETERMINATION SYSTEM

BACKGROUND

Technical Field

The present disclosure generally relates to an engine malfunction determination system. More specifically, the present disclosure relates to an engine malfunction determination system for a vehicle.

Background Information

Vehicle engine control modules can generate one or more Diagnostic Trouble Codes (DTC) to diagnose malfunctions in the vehicle's engine. Typically, a DTC activates a malfunction indicator lamp (MIL) also known as the check engine light to alert drivers that there is an issue.

SUMMARY

In view of the state of the known technology, one aspect of the present disclosure is to provide an engine malfunction determination system comprising a vehicle engine, an engine sensor system, an engine control module and an electronic display device. The engine sensor system has at least one sensor configured to detect an operation condition of the vehicle engine. The engine control module is in electrical communication with the sensor system to receive a detection signal from the engine sensor system regarding the operation condition of the vehicle engine. The engine control module is programmed with software/hardware to determine an anomaly in the detection signal. The electronic display device is programmed to display an indication of engine malfunction when the engine control module determines that the anomaly in the detection signal exceeds a predetermined threshold.

In view of the state of the known technology, another aspect of the present disclosure is to provide a method for determining a vehicle engine anomaly. The method comprises receiving a detection signal from the engine sensor system by an engine control module in electrical communication with the sensor system. The method further comprises generating a reference signal using an electronic reference signal generator integrated with the engine control module. The method further comprises comparing the electronic reference signal with the detection signal generated by the engine sensor system to determine when the detection signal deviates from the electronic reference signal.

In view of the state of the known technology, another aspect of the present disclosure is to provide a method for determining a vehicle engine anomaly. The method further comprises receiving a detection signal from the engine sensor system by an engine control module in electrical communication with the sensor system. The method further comprises wirelessly transmitting the detection signal from the engine sensor system to a remote server at predetermined intervals using a telematic control unit. The method further comprises calculating a mean and standard deviation of the detection signals transmitted over time.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
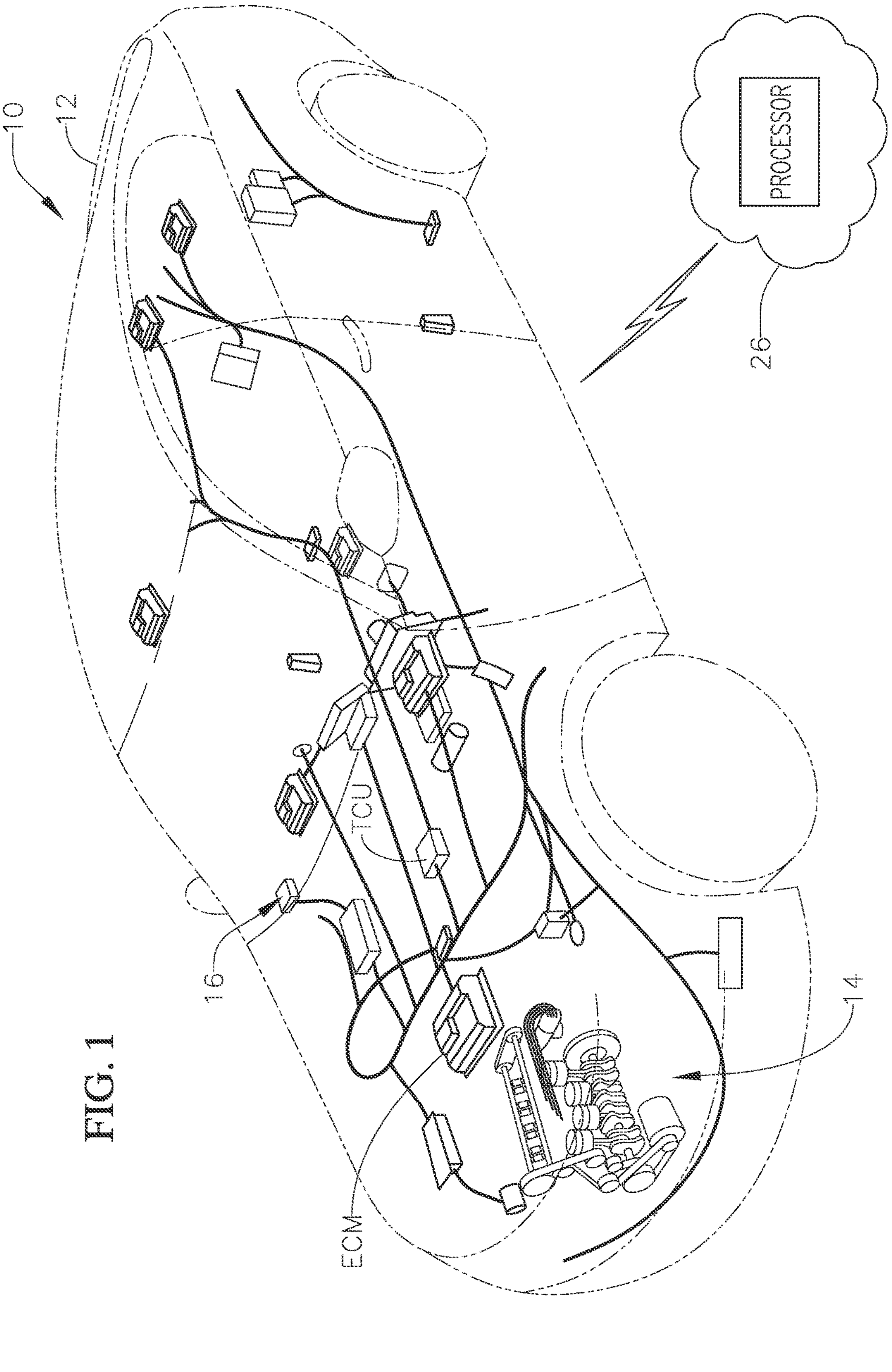
FIG. 1 is a schematic view of a vehicle equipped with an engine malfunction determination system in accordance with an illustrated embodiment.
Figure 2:
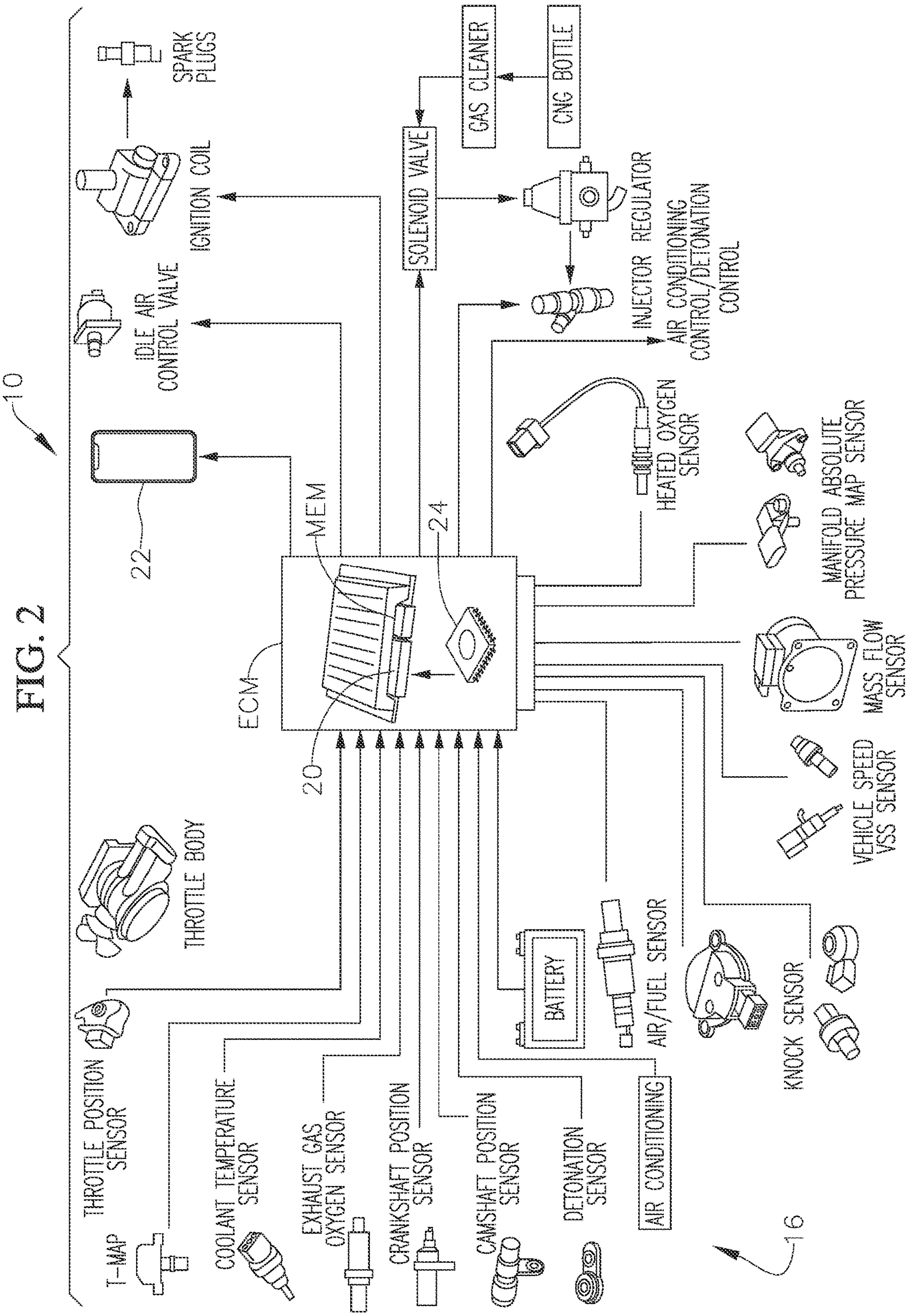
FIG. 2 is a schematic view of a sensor system and an engine control module of the engine malfunction determination system.

Referring initially to FIG. 1, an engine malfunction determination system 10 for a vehicle 12 is illustrated in accordance with an illustrated embodiment. The vehicle 12 is equipped with a vehicle engine 14, an engine sensor system 16, an engine control module ECM, and a telematic control unit TCU. In the illustrated embodiment, the engine malfunction determination system 10 comprises the vehicle engine 14. In the illustrated embodiment, the vehicle 12 is equipped with an on-board satellite navigation device (i.e., a global positioning device) and a telematics control unit TCU, as best seen in FIGS. 1 and 2. The on-board satellite navigation device and the telematics control unit TCU are considered examples of control modules for navigation assistance.

The vehicle engine 14 includes a conventional engine 14 components, such as an engine block housing the engine 14 pistons. The cylinder block is comprised of cylinder tubes. The vehicle engine 14 can include one or more cylinder blocks. The engine 14 further includes a combustion chamber housing the energy conversion process to power the pistons. Fuel, air, electricity, and pressure have an explosive reaction inside the combustion chamber which causes the pistons to move up and down. The engine 14 includes a cylinder head housing components such as intake and outtake valves, the spark plugs, and the fuel injectors.

Energy is created when the pistons then move up in down in order to give the vehicle 12 power to move. The pistons are connected to a crankshaft and consist of compression rings and oil rings which help to seal the combustion chamber and prevent oil from leaking into that area. The engine 14 further includes the crankshaft which transfers energy created in the engine 14 to the wheels. In particular, the crankshaft is connected to a camshaft by a series of belts to deliver energy to various parts of the vehicle 12.

The engine 14 further includes fuel injectors work to move fuel into the cylinders. The engine 14 can be equipped with any time of fuel injection systems, such as direct fuel injection, ported fuel injection, or throttle body fuel injection. The engine 14 further includes spark plugs positioned above each of the cylinders. During the combustion process, the spark plugs ignite the compressed fuel and air and therefore causing an "explosive" process that drives the pistons.

The engine 14 further includes valves, such as intake valves and outtake valves. The intake valves work to transfer air and fuel into the combustion chamber. The outtake valves work to move the exhaust that is created from the combustion out of the chamber. The engine 14 further includes a valvetrain that controls the movement of the valves. The valvetrain is made up of the valves, as well as the pushrods and lifters, and rocker arms. The rocker arms work with the cams (from the camshaft) to press down on the valvetrain and let the needed air into the combustion chamber or the exhaust out.

The camshaft of the engine 14 works with the crankshaft and are connected by a timing chain to allow the intake and outtake valves to open and close according to a specific timeline. The camshaft, the crankshaft, the timing chain and the intake and outtake valves work together to make sure certain actions take place at certain times, which is vital for the functioning of the engine 14.

Referring to FIG. 2, the engine sensor system 16 has at least one sensor configured to detect an operation condition of the vehicle engine 14. In the illustrated embodiment, the operation condition of the vehicle engine 14 includes at least one of air-fuel ratio, idle speed, variable valve timing, and ignition timing. The sensor system 16 can monitor the operational status and condition of components of the vehicle 12 to generate sensor outputs which are indicative of the operational status and conditions of the monitored components. Therefore, the sensors 16 can measure a wide range of system and component parameters.

For example, the sensors 16 can measure engine 14 temperature, battery voltage, fluid flow rate, oil temperature and pressure, transmission and wheel speed, emission control function, cylinder head temperature, etc. The parameter data acquired by the sensors 16 can be associated with parameter identification (PID) data, which may represent codes used to request data from the vehicle 12 sensor system 16. Conventionally, if the parameters fall outside of a normal range of operation, a fault code (e.g., a diagnostic trouble code, or DTC) is generated in the engine control module ECM and can be sent to the IVI or customer mobile device in order to warn the driver of pending engine failure.

The sensor of the engine malfunction determination system 10 detect the operation of various components of the engine 14, such as operation of the fuel injectors, the cylinder's pressure or combustion, the fuel vaporizer, the air fuel, the fuel pump, the valves, the ignition coil, the spark plugs, or the timing control of the components within the engine 14, etc. As seen in FIG. 2, the sensors 16 are in electrical communication with the engine control module ECM which controls various operations of the ignition, such as throttle control, ignition control or exhaust control based on the information detected by the sensors 16.

Preferably, the engine malfunction determination system 10 of the illustrated embodiment determines a potential or imminent engine malfunction based on the vehicle's 12 detected oxygen-to-fuel ratio. However, it will be apparent to those skilled in the vehicle field from this disclosure that the malfunction determination system can determine a potential or imminent engine malfunction based on any of the operation conditions of the other components of the vehicle engine 14, mentioned above. Preferably, in the illustrated embodiment, the engine malfunction determination system 10 functions as an engine failure prediction system.

In the illustrated embodiment, the engine sensor system 16 includes at least one of a mass airflow sensor, an oxygen sensor, and an air-fuel sensor. The mass airflow sensor is installed between the air filter and the intake manifold of the engine 14. The mass airflow sensor measures the amount of air entering the engine 14 or the air flow. The mass airflow sensor preferably includes an intake air temperature or IAT sensor that is built in the mass airflow sensor. The mass airflow sensor measures an electric current that is proportional to air flow. The engine control module ECM can calculate how much fuel to inject based on information detected by the mass airflow sensor to maintain the engine's 14 air-to-fuel ratio at an optimal level.

The oxygen sensor measures the amount of oxygen in the exhaust gasses that exit the engine 14. The oxygen sensor informs the engine control module ECM the amount of unburnt oxygen in the exhaust system. The engine control module ECM can determine the correct air-to-fuel ratio for the engine 14 based on information detected by the oxygen sensor. The oxygen sensor is located in the vehicle's 12 exhaust system, which allows the fuel injection and engine 14 timing to work efficiently.

The air fuel ratio (A/F) sensor measures oxygen content of the exhaust in a wider range. The A/F sensor can be a "broadband lambda sensor" or "lambda probe." The A/F sensor is preferably installed in the engine's 14 exhaust manifold or in the front exhaust pipe. The A/F sensor determines the oxygen content in the exhaust and provide feedback to the engine control module ECM. Based on the A/F sensor signal, the engine control module ECM can adjust the air to fuel ratio to keep it at the optimum level, which is about fourteen (14) parts of air to one (1) part of fuel. For example, the A/F sensor can be used- to detect a potential engine 14 misfire, which occurs when there is incomplete combustion in the engine 14 cylinder or when combustion chamber is malfunctioning. Incomplete combustion can lead to failure in the ignition and/or the fuel injectors, etc.

Together, the sensors 16 of the engine malfunction determination system 10 enable the engine control module ECM to determine or measure the output of the engine 14. The engine control module ECM can determine the output of the engine 14 in the form of engine 14 revolutions per minute (RPM). That is, the sensors 16 detect the rate or number of times the engine's 14 crankshaft makes a full rotation every minute. In this way, the engine control module ECM can determine how many times the pistons pump up and down in the cylinder.

It will be apparent to those skilled in the vehicle field from this disclosure that the engine malfunction determination system 10 is in no way limited to the sensors 16 mentioned herein and can include any and all sensors 16 necessary for the detection of the engine 14 operation state, such as those sensors 16 listed in FIG. 2.

As stated, the engine control module ECM is in electrical communication with the sensor system 16 to receive detection signals from the engine sensor system 16 regarding the operation condition of the vehicle engine 14. The engine control module ECM is programmed to determine an anomaly in the detection signal to determine possible engine malfunction, as will be further discussed below.

The ECM regulates the vehicle's 12 operating systems such as air-fuel ratio, idle speed, variable valve timing, and ignition timing. In terms of the air-fuel ratio, the ECM uses the mass airflow sensor(s), the oxygen sensor(s), and the A/F sensor(s). The ECM relies on sensors 16 located by the crankshaft and camshaft(s) to track the vehicle's 12 revolutions per minute (RPM) and engine load. In this way, the ECM can monitor the speed of rotation of the engine 14 in order to control the idle speed. The ECM controls the variable valve timing of the valves opening in the engine 14 to either increase power or fuel economy. The ECM controls the ignition timing based on the position at which the spark plug is fired within the combustion cycle. Precise control of this timing allows for more power and/or better fuel economy.

As stated above, typically if the parameters detected by the sensors 16 fall outside of a normal range of operation, a DTC can be transmitted to warn the driver of engine failure. However, typically, by the time a DTC code is sent to the ECM, the vehicle 12 may be non-functional in a very short time thereafter and vehicle 12 towing might be unavoidable. Therefore, the engine malfunction determination system 10 of the illustrated embodiment is provided to determine engine malfunction at a time prior to engine failure and notify the driver so that the driver can take mitigating steps to avoid engine failure. The engine malfunction determination system 10 of the illustrated embodiment monitors real-time parameters detected by the sensors 16 and compares the parameters to pre-stored values during real-time vehicle 12 operation, as will be further described below.

The ECM includes a processor 20 and a non-transitory computer-readable medium MEM. The processor 20 can include any device or combination of devices capable of manipulating or processing a signal or other information now-existing or hereafter developed, including optical processors, quantum processors, molecular processors, or a combination thereof. For example, the processor can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 20 is operatively coupled with the computer readable medium MEM, the sensors 16, the TCU, the NAV and the display device 22.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

The processor 20 can executed instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by the processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor receives instructions from the computer-readable medium MEM and executes these instructions, thereby performing one or more processes, including one or more of the processes described herein. Such instructions and other data may be stored and transmitted using a variety of computer-readable media.

As used herein, the terminology "memory" or "computer-readable medium MEM" (also referred to as a processor-readable medium MEM) indicates any computer-usable or computer-readable medium MEM or device that can tangibly contain, store, communicate, or transport any signal or information that may be used by or in connection with any processor. For example, the computer readable medium MEM may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The computer readable medium MEM can store a plurality of predetermined thresholds for determining an anomaly in the detection signals transmitted by the sensors 16. For example, the computer readable medium MEM can store a standard deviation threshold of the predetermined thresholds. The computer readable medium MEM can further store a first predetermined threshold that is a predetermined threshold for determining a potential engine malfunction or failure. The computer readable medium MEM can further store a second predetermined threshold that is a predetermined threshold for determining imminent engine malfunction or failure.

Figure 7:
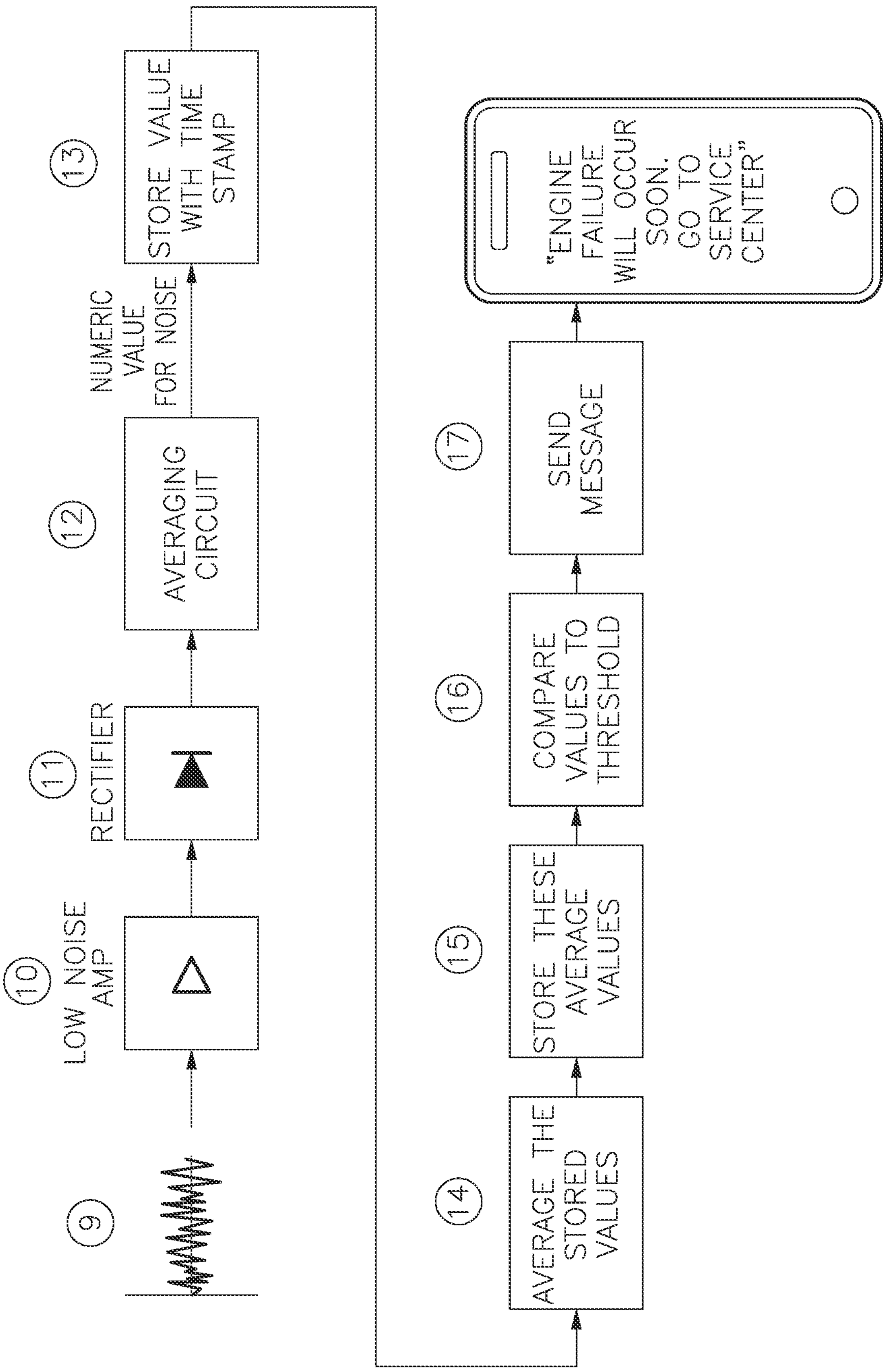
FIG. 7 is a schematic view of continued in-view processing steps conducted by the engine malfunction determination system.

The engine malfunction determination system 10 further comprises an electronic display device 22, for example shown in FIG. 7. The electronic display device 22 is in electrical communication with the engine control module ECM. The electronic display device 22 is programmed to display an indication of engine malfunction when the engine control module ECM determines that the anomaly in the detection signal exceeds a predetermined threshold.

In the illustrated embodiment, the electronic display device 22 is programmed to display a warning indication of potential engine malfunction when the engine control module ECM determines the anomaly in the detection signal exceeds the first predetermined threshold of the predetermined threshold. The electronic display device 22 is programmed to display another warning indication of imminent engine malfunction when the engine control module ECM determines the anomaly in the detection signal exceeds the second predetermined threshold of the predetermined threshold. The display device 22 can further display icons, graphics or instructions indicating crucial areas of interest to direct the driver's focus.

The vehicle 12 can be equipped with the electronic display device 22 configured to display notification data to the driver. The electronic display device 22 is preferably positioned an interior compartment of the vehicle 12 as part of the console. The electronic display device 22 can also be a heads up display on the vehicle's 12 windshield or a mobile device that is in electronic communication with the ECM.

The vehicle display device 22 can include a single type display, or multiple display types (e.g., both audio and visual) configured for human-machine interaction. The vehicle display device 22 can be configured to receive user inputs from the vehicle 12 occupants. The vehicle display device 22 can include, for example, control buttons and/or control buttons displayed on a touchscreen display (e.g., hard buttons and/or soft buttons) which enable the user to enter commands and information.

The telematic control unit TCU collects signals from the engine sensor system 16 and transmitted to a remote server 26. The telematic control unit TCU is programmed to wirelessly transmit detection signals from the engine sensor system 16 to the remote server 26 at predetermined intervals.

TCU can include a satellite navigation unit (GNSS) receiver or GPS receiver that is capable of receiving information from GNSS satellites then calculate the device's geographical position. The TCU can further include external interface for mobile communication (GSM, GPRS, Wi-Fi, WiMax, LTE or 5G), an electronic processing unit, a microcontroller or a microprocessor or field programmable gate array (FPGA). The TCU can send controller area network (CAN bus) signals to a controller or microprocessor of the remote server 26. The TCU further includes some amount of memory for saving values in case of mobile-free zones or to intelligently store information about the vehicle's 12 sensor data. Data from the sensors 16 can also be transmitted by the TCU to the remote server 26 or to the vehicle 12 network. That is, the vehicle's 10 location, method of traversal and own experience on a navigation path can also be transmitted to the remote server 26 or the cloud network.

The TCU is an embedded computer system that wirelessly connects the vehicle 12 to cloud services or other the vehicle network via vehicle-to-everything (V2X standards) over a cellular network. The TCU collects telemetry data regarding the vehicle 12, such as position, speed, engine data, connectivity quality etc. by interfacing with various sub-systems and control busses in the vehicle 12. The TCU can also provide in-vehicle connectivity via Wi-Fi and Bluetooth. The TCU can include an electronic processing unit, a microcontroller, a microprocessor or field programmable gate array (FPGA), which processes information and serves to interface with the GPS unit. The TCU can further include a mobile communication unit and memory for saving GPS values in case of mobile-free zones or to intelligently store information about the vehicle's 12 sensor data. Therefore, the memory that stores the information from the TCU can either be part of the TCU or the vehicle's 12 on-board ECU.

The TCU can also communicate with the vehicle network via an access point. The access point can be a base station, a base transceiver station (BTS), a Node-B, an enhanced Node-B (eNode-B), a Home Node-B (HNode-B), a wireless router, a wired router, a hub, a relay, a switch, or any similar wired or wireless device. The vehicle 12 can communicate with a vehicle network via the NAV or the TCU. In other words, the TCU can be in communication via any wireless communication network such as high bandwidth GPRS/1× RTT channel, a wide area network (WAN) or local area network (LAN), or any cloud-based communication, for example. Therefore, using the TCU, the vehicle 12 can participate in a computing network or a cloud-based platform.

The vehicle 12 can transmit detection signals detected by the sensors 16 to the remote server 26 (cloud-based platform) over the TCU. The remote server 26 can compute whether anomalies in the detection signals meet a predetermined threshold so to send a warning to the driver via the display device 22. Calculation by the remote server 26 (cloud-based process) will be further discussed below.

Figure 3:
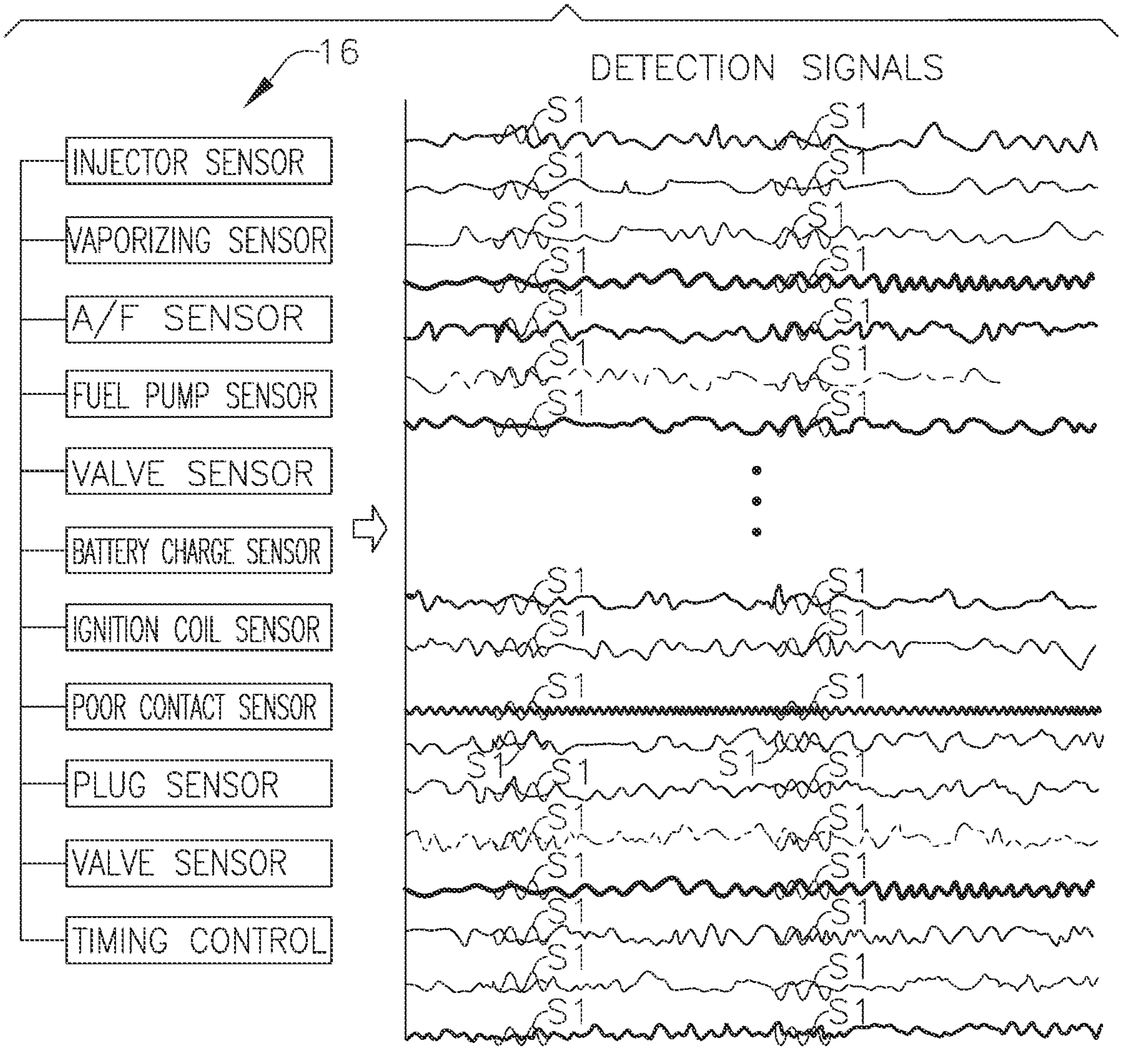
FIG. 3 is a schematic view of sample detection signals detected by the sensor system each of the detection signals having a reference signal injected thereon.
Figure 4:
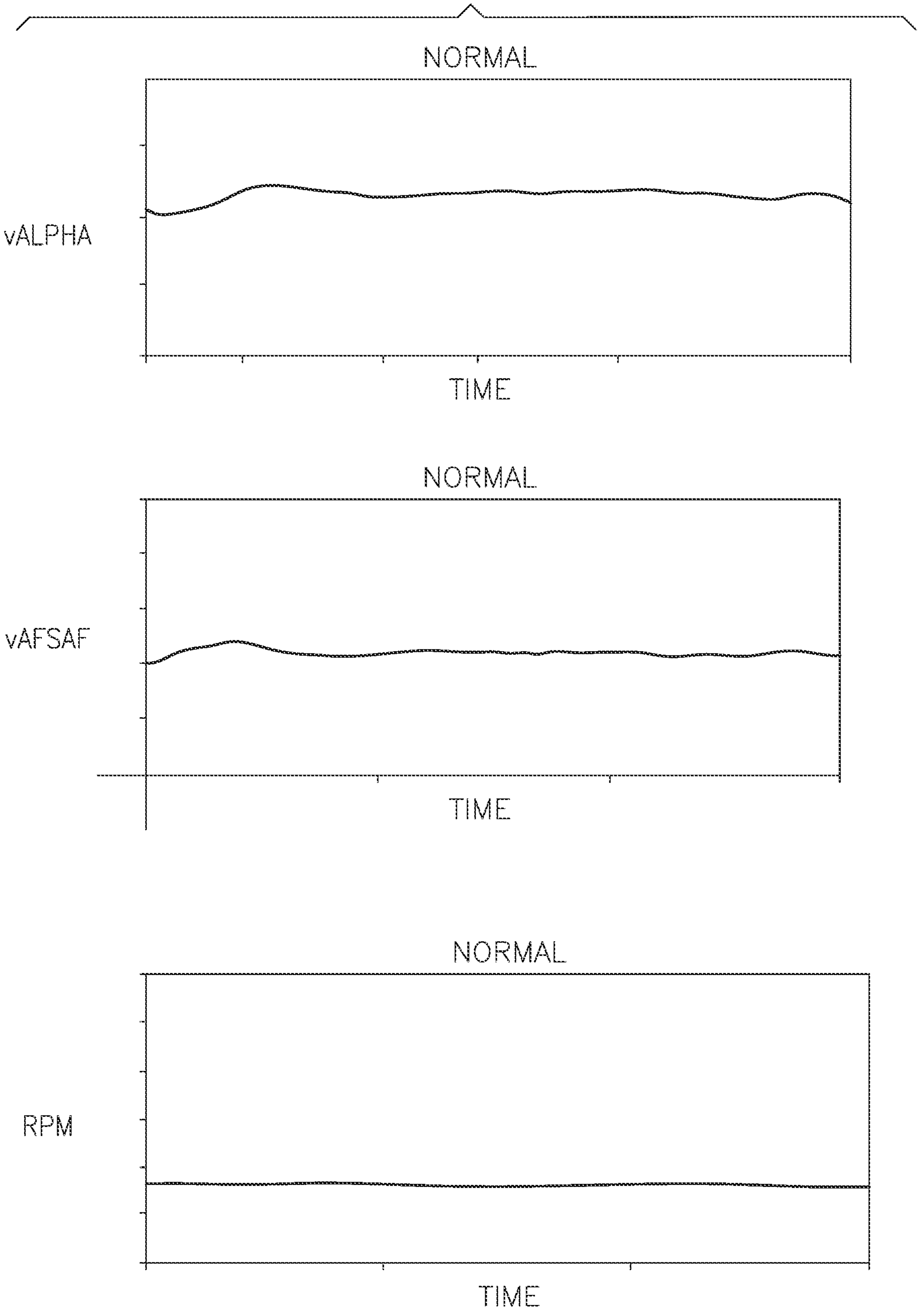
FIG. 4 is a schematic view of sample detections signals that are normal.
Figure 5:
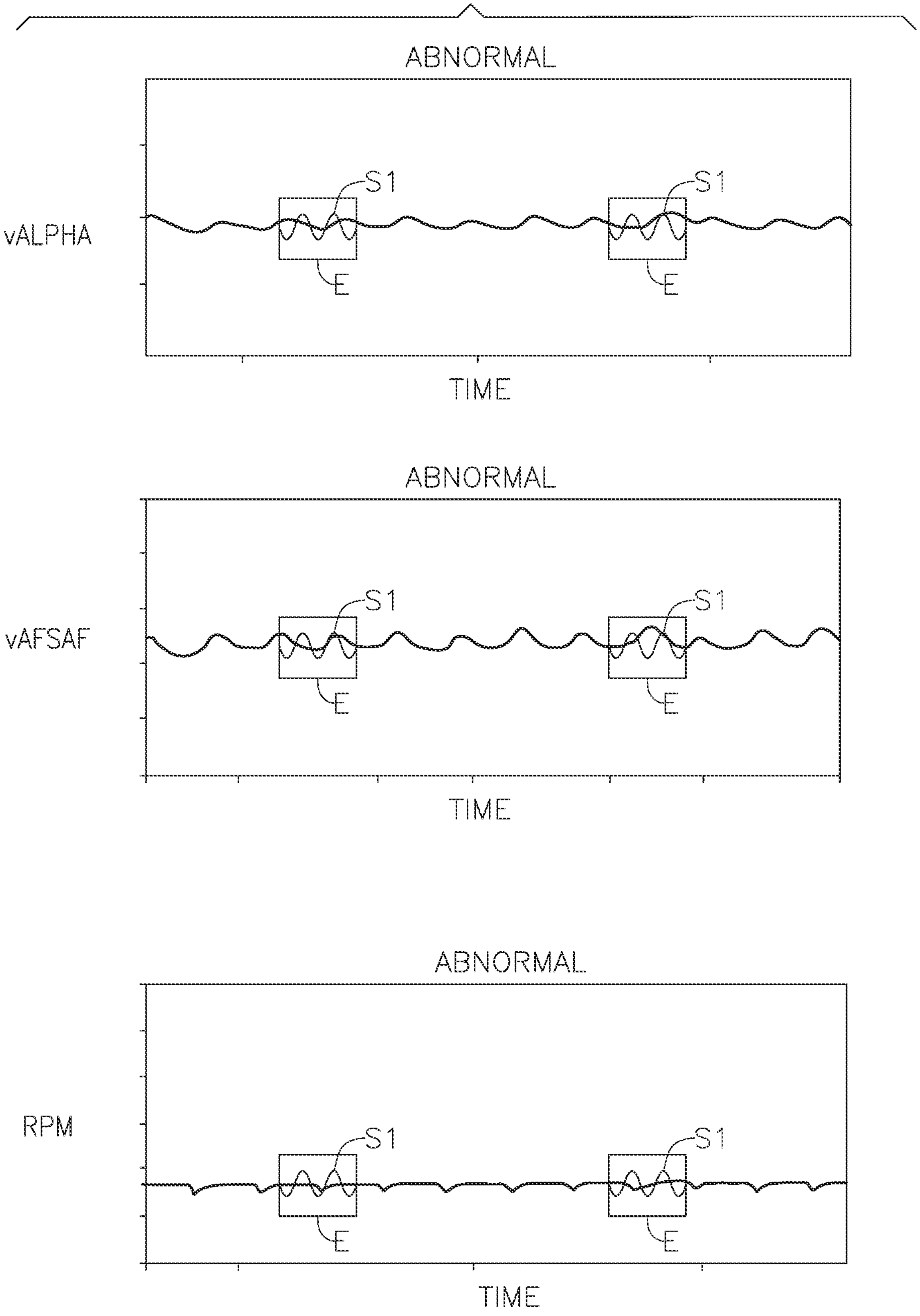
FIG. 5 is a schematic view of sample detections signals that are injected with reference signals to show that the sample detection signals are abnormal.
Figure 6:
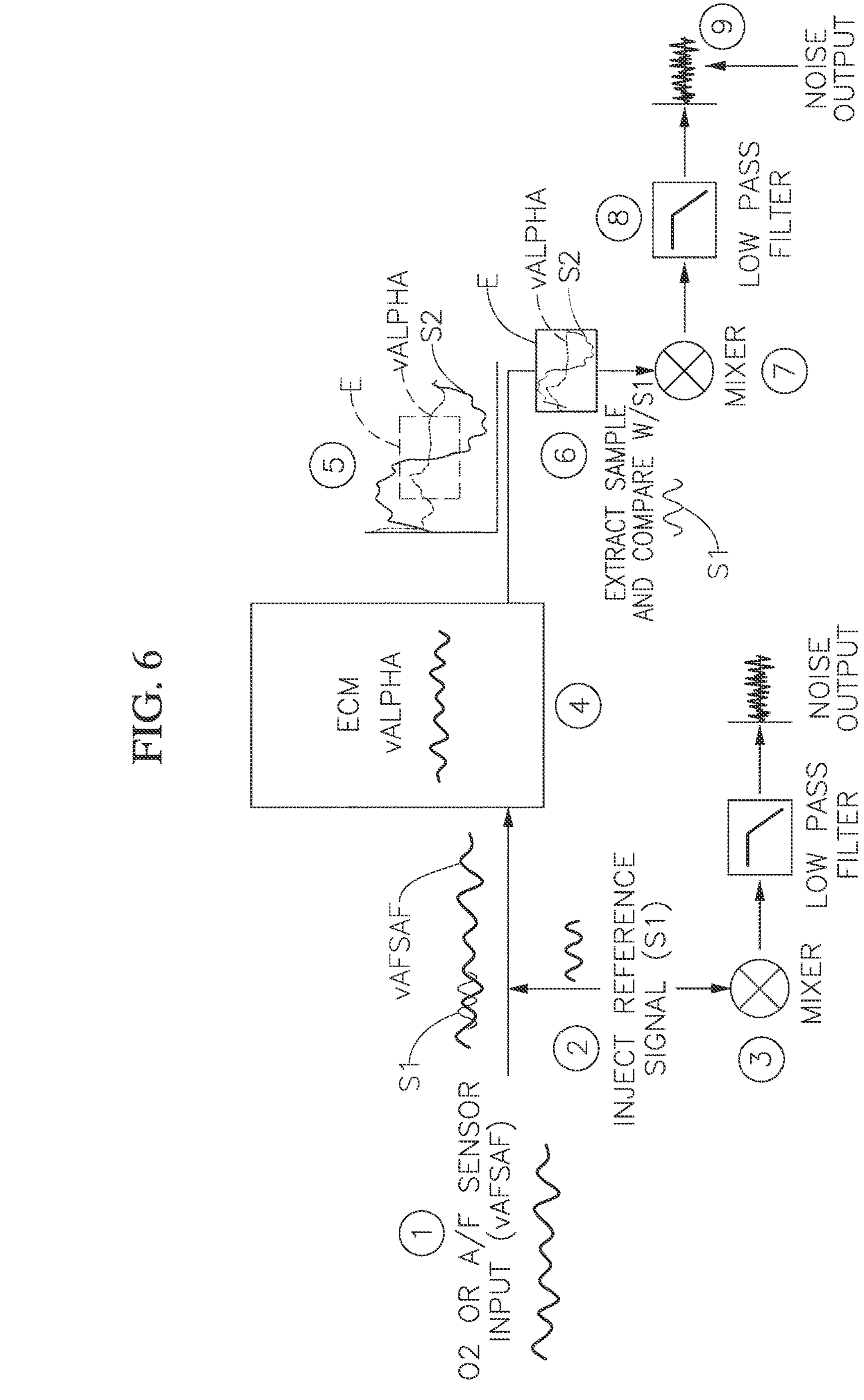
FIG. 6 is a schematic view of in-vehicle processing steps conducted by the engine control module of the engine malfunction determination system.

Referring to FIGS. 2 and 3, the detection signals generated by the sensors 16 will be further discussed. As stated above, the detection signals generated by the airflow sensor(s), the oxygen sensor(s), and the A/F sensor(s) can generate signals for the ECM. For example, as seen in FIG. 6, the A/F sensor can generate detection signals with a value of "vAFSAF" which depicts a detected air/fuel ratio. Preferably, the detection signals of the A/F sensor (the vAFSAF) are transmitted in the form of an AC current signals in frequency values of hertz. The frequency of the detection signals can vary depending on the sampling rate of the A/F sensor. For example, at a sampling rate of every one hundred (100) milliseconds, the detection signals generated by the A/F sensor can be between one (1) to five (5) Hz.

The engine malfunction determination system 10 further comprises an electronic reference signal generator, as seen in FIG. 2. In the illustrated embodiment, the electronic reference signal generator is a microchip 24. The microchip 24 is preferably integrated with existing microchips 24 in the engine control module ECM, or integrated with a multi-chip module for the ECM. Therefore, the ECM preferably includes the microchip 24 that generates the reference signal. The microchip 24 generates an electronic reference signal S1 at predetermined intervals to be processed by the engine control module ECM, for example as seen in FIG. 3.

For example, the microchip 24 can inject a reference signal S1 for the detection signals generated by the sensors 16 every 100 milliseconds during vehicle 12 use. That is, the microchip 24 preferably generates a reference signal S1 at a rate corresponding to the sampling rate of the A/F sensor, as will be further discussed below.

The microchip 24 generates a series of reference signals S1 that is injected to one or more detection signals detected by the sensors 16. One example is the reference signals S1 injected with the detection signals vAFSAF of the A/F sensor, as seen in FIG. 6 as an example. However, as seen in FIG. 3, the microchip 24 generates reference signals S1 that can be injected to each of the detection signals that are transmitted from the sensors 16 to the ECM. While only one microchip 24 is illustrated for brevity, it will be apparent to those skilled in the vehicle field from this disclosure that the ECM can be equipped with a plurality of microchips 24 for generating reference signals S1 for all of the sensors 16, as necessary.

Preferably, as seen in FIG. 3, the reference signal S1 is a perfect sinusoidal signal that is overlaid on top of the detection signals generated by the sensors 16 at predetermined intervals throughout a vehicle trip. The reference signal S1 is preferably a small amplitude signal that will not disrupt processing of the detection signals. The "noise" between the detection signals and the reference signals S1 can indicate an anomaly in the detection signals, and therefore anomalies in the engine processing.

As seen in FIG. 3, a series of sample detection signals are illustrated each corresponding to the engine component that is being monitored by the sensors 16. As shown, FIG. 3 illustrates a series of sample reference signals S1 that are generated by the microchip(s) 24 and injected to the detection signals. The reference signals S1 set a baseline parameter for comparison with the detection signals. The comparison can be assessed either prior to the detection signals being processed by the ECM or afterward, as seen in FIG. 6, and as will be further discussed below.

The sampled reference signals S1 can be used as correction factors or values transmitted by the microchip 24 to the ECM over time or the remote server 26 (cloud-based platform). Therefore, the sampled reference signals S1 is part of an extracted portion E of the detection signals and be considered "correction factors" for each sensor.

The engine control module ECM then preferably determines the "noise" in the detection signals by analyzing the reference signals S1 to infer anomalies in the detection signals. In this way, the ECM can infer engine output signal variations based on the noise in the detection signals.

Referring to FIGS. 6 and 7, a process for assessing the "noise" or anomalies to the detection signal vAFSAF generated by the A/F sensor will now be discussed. FIGS. 6 to 7 depict a series of steps that is carried out by processor(s) in the vehicle 10. As shown in step (1) the A/F sensor generates the vAFSAF detection signal. The vAFSAF signal can be primarily a direct current (DC) signal having imperfect wavelengths. The microchip 24 injects the reference signal S1 to the vAFSAF detection signal at step (2). The reference signal has a "perfect" wavelength with small amplitude to not disrupt the vAFSAF signal. Preferably, the reference signal S1 is a pristine sinusoidal signal.

In step (3), the vAFSAF detection signal having the reference signal overlay S1 can be inserted into a mixer or a subtractor that determines a difference in the amplitudes between the reference signal S1 and the vAFSAF detection signal. The combined signal can be sent through a low pass filter and the resulting noise output can be assessed in order to determine any anomalies.

Alternatively, the vAFSAF detection signal with the reference signal S1 overlay can be sent to the engine control module ECM in step (4) for assessing a signal output of the ECM for anomalies. That is, steps following step (4) is an alternative to the step (3). The engine control module ECM generates various output signals and intermediate output signals, such as the signal vALPHA. Because the signal vALPHA is an output of processing of the vAFSAF in the ECM, the output vALPHA is a distorted signal. In step (5) the extracted portion E of vALPHA is extracted by the processor 20.

Here, the reference signal S2 (which is a distorted version of the reference signal S1) serves a tag onto the processed vALPHA signal that is a sampled (extracted) portion of vALPHA. Therefore, in step (6), a portion of the vALPHA signal having the reference signal S2 is extracted as the extracted sample E and compared to the original reference signal S1 that is a pristine signal. In this way, the distortions or anomalies of the original vAFSAF signal can be assessed by comparing a difference between the reference signal S2 signal and the reference signal S1.

The extracted portion E is then processed into the mixer and the low pass filter to get an output signal in steps (7) to (9). Referring to FIG. 7, the output signal is processed throw a low noise amplifier in step (10) followed by a rectifier in step (11). The output signal is then averaged in step (12) so that a numerical value is assigned is assigned by a processor for the noise values of the output signal. The noise values are then stored with a time stamp in step (13) by the processor and an average of the stored noise values are determined and stored in steps (14) to (15). In step (16) the average stored values over a period of time can be compared to threshold noise values. When the average noise values exceed the predetermined noise values, then the processor sends a signal to the display device that engine failure is imminent.

Preferably, in the illustrated embodiment the ECM inputs a time stamp to each detection signal transmission and reference signal transmission. In this way, the ECM can generate a distribution of parameters comprising of the sampled portions E of the signals and the quantified noise values of the sampled portions E. The distribution of parameters are then compared with predetermined thresholds that are prestored in the MEM. The ECM then determines when the ECM processed noise signals deviate from the input electronic reference signal S1. In this way, the engine control module ECM is programmed to determine the engine anomaly when the ECM processed noise signal deviates from the input electronic reference signal S1 beyond the predetermined threshold.

In this example, a threshold value for the distribution of noise values for the sampled portion E can be considered an example of a first predetermined threshold that is prestored in the MEM. The display device 22 can generate a notification advising the driver of probable or potential engine malfunction or failure and advise visiting a dealership. The display device 22 can generate a notification a warning that engine failure is imminent and to advise the driver to turn OFF the vehicle 12 at this stage.

Additionally, the engine control module ECM can infer that the engine RPM is out of a normal range based on anomalies in the detected signals vAFSAF. For example, the engine control module ECM can infer that the engine RPM is outside of the typical range of two (2) thousand and three (3) thousand RPM during revving, or outside of six (6) hundred to eight (8) hundred RPM when idle. Therefore, these values for the engine 14 output can also be prestored in the MEM to determine engine 14 anomaly.

Figure 8:
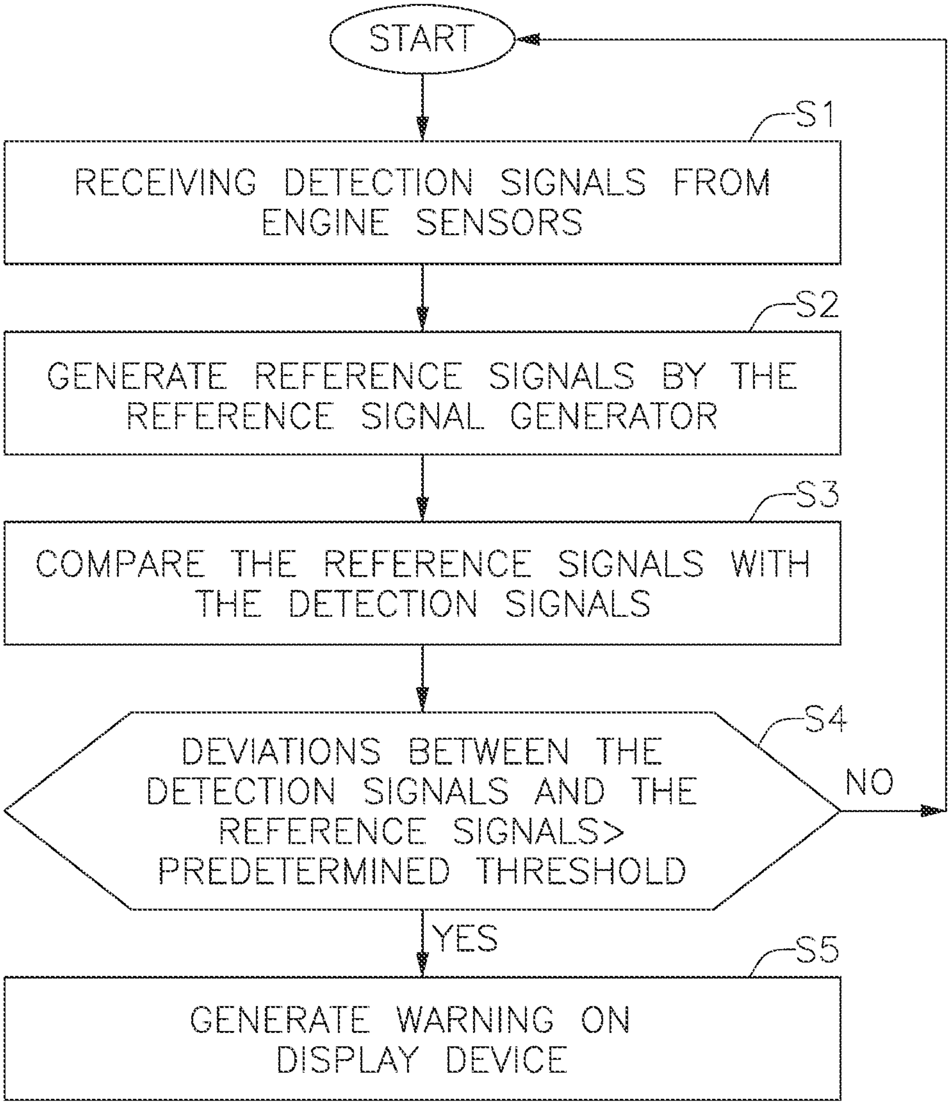
FIG. 8 is a flowchart showing a method for determining engine malfunction that can be carried out by the components of the engine malfunction determination system.

Referring now to FIG. 8, a method for determining an engine malfunction by the engine control module ECM is illustrated. The method can be carried out by the components of the engine malfunction control system described herein. Therefore, the method can be carried out by the engine control module ECM and its comprising components. It will be apparent to those skilled in the vehicle field from this disclosure that the method can be executed by the engine control module ECM along with any of the electronic control units on board the vehicle 12. Therefore, the method illustrated in FIG. 8 is a method for determining engine malfunction using electronic control units on-board the vehicle 12.

In step S1, the method comprises receiving a detection signal from the engine sensor system 16 by an engine control module ECM in electrical communication with the sensor system 16. In this step, the engine control module ECM acquires an operation condition of a vehicle engine 14 from the engine sensor system 16 in step S1. In step S2, the microchip 24 generates an electronic reference signal S1 that is a perfect sinusoidal signal. In step S3, the engine control module ECM compares the electronic reference signal S1 with the detection signal generated by the engine sensor system 16 to determine when the detection signal deviates from the electronic reference signal. As illustrated in FIG. 3, the reference signal S1 is preferably overlaid over the detection signal from the sensors 16. In this way, the engine control module ECM can monitor the "noise" in the detection signals to determine any anomalies.

In step S4, the engine control module ECM determines when the detection signal deviates from the electronic reference signal S1 beyond a predetermined threshold. Here, the detection signal can either be vAFSAF or the distorted signal S2 that is being compared to the pristine signal S1. As stated above, the engine control module ECM determines whether the anomaly in the detection signal exceeds the first predetermined threshold of the predetermined threshold to generate a potential engine malfunction warning on the display device 22. The method can further comprise determining an imminent engine malfunction by determining the anomaly in the detection signal exceeds the second predetermined threshold of the predetermined threshold, as stated above. The display device 22 can then generate an imminent engine malfunction warning. The steps S1 to S5 depicted in FIG. 8 essentially correspond to steps (1) to (3) and steps (9) to (17) of FIGS. 6 and 7.

Referring to FIGS. 9 to 13, a potential or imminent engine malfunction can be determined by the remote server 26 in communication with the vehicle 12, rather than being determined by the engine control module ECM (i.e., a cloud-based approach). As stated, the TCU of the vehicle 12 can send CAN Bus signals (to the remote server 26 where computation will take place. That is, the remote server 26 can include a processor that is programmed to determine a mean and standard deviation of the detection signals transmitted over time. The display device 22 is programmed to display the indication of engine malfunction when the standard deviation of the detection signals exceeds a standard deviation threshold of the predetermined threshold similar to that described for the in-vehicle 12 calculation method.

Preferably, the TCU transmits detection signals from the sensors 16 to the remote server 26 at predetermined intervals, such as every fifteen (15) seconds of a trip. That is, the TCU can send signals vAFSAF from the A/F sensor to the remote server 26. Alternatively, the TCU can transmit engine 14 output signals RPM to the remote server 26 for monitoring. Alternatively, the TCU can also transmit any discrepancies between the detection signals vAFSAF and the reference signals vALPHA to the remote server 26.

Figure 9:
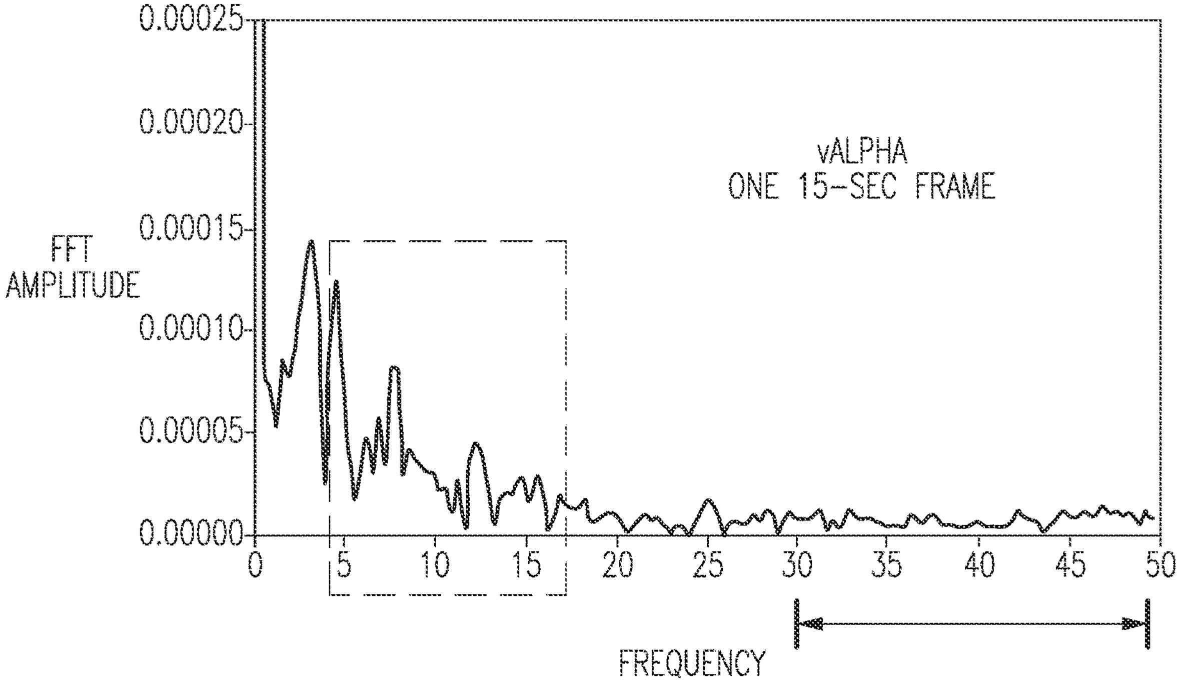
FIG. 9 is a sample fast fourier transform of a signal outputted by an engine control module of the vehicle.
Figure 11:
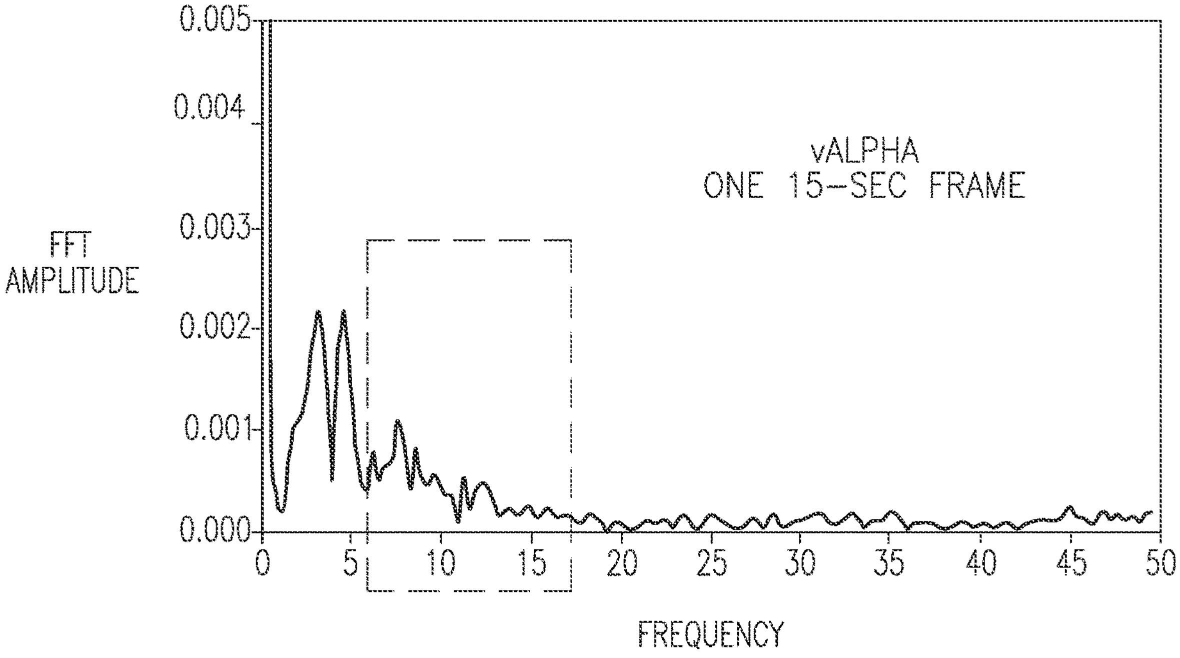
FIG. 11 is another sample fast fourier transform of a signal outputted by the engine control module of the vehicle.
Figure 13:
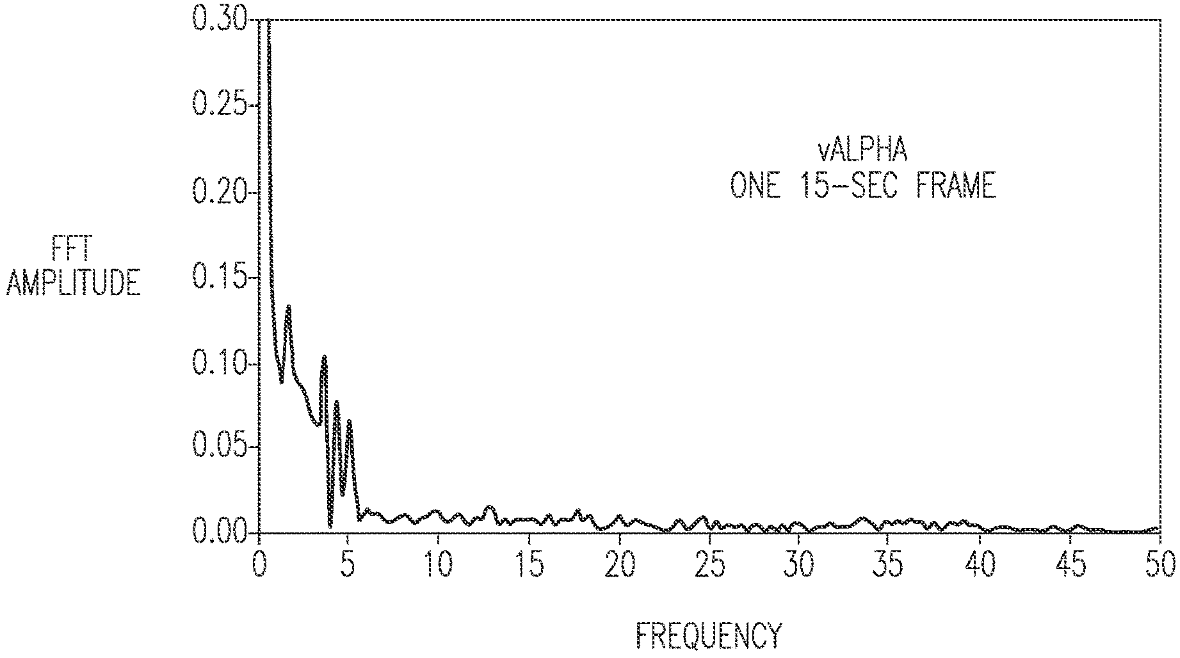
FIG. 13 is another sample fast fourier transform of a signal outputted by the engine control module of the vehicle.

The processor of the remote server 26 is preferably programmed to compute fast fourier transform (FFT) of the transmission intervals (i.e., time segments). For example, FIGS. 9, 11 and 13 depict sample FFT's for a series of time segments. The processor of the remote server 26 is preferably programmed to integrate the FFT over a selected frequency range to obtain FFT Energy (FFTE) value for the transmission intervals.

Figure 10:
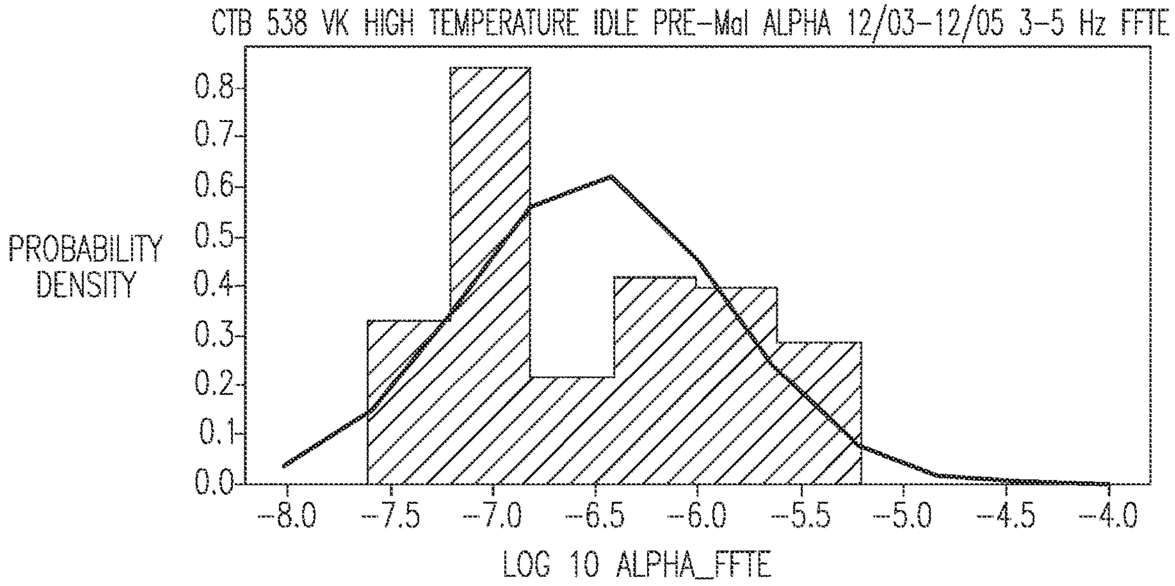
FIG. 10 is a distribution graph based off of the fast fourier transform of FIG. 9.
Figure 12:
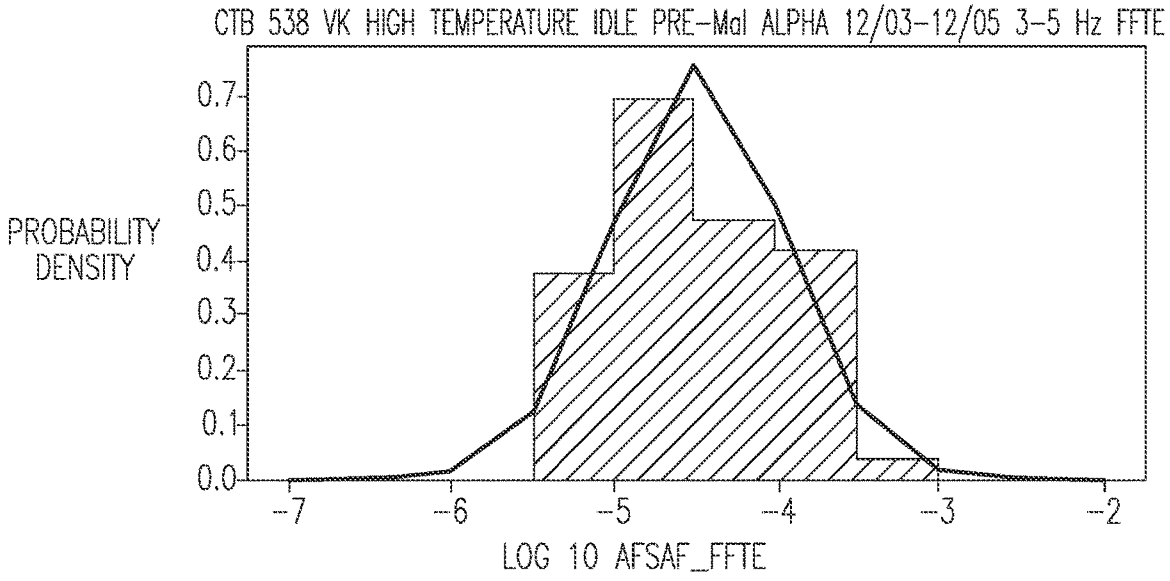
FIG. 12 is a distribution graph based off of the fast fourier transform of FIG. 11.
Figure 14:
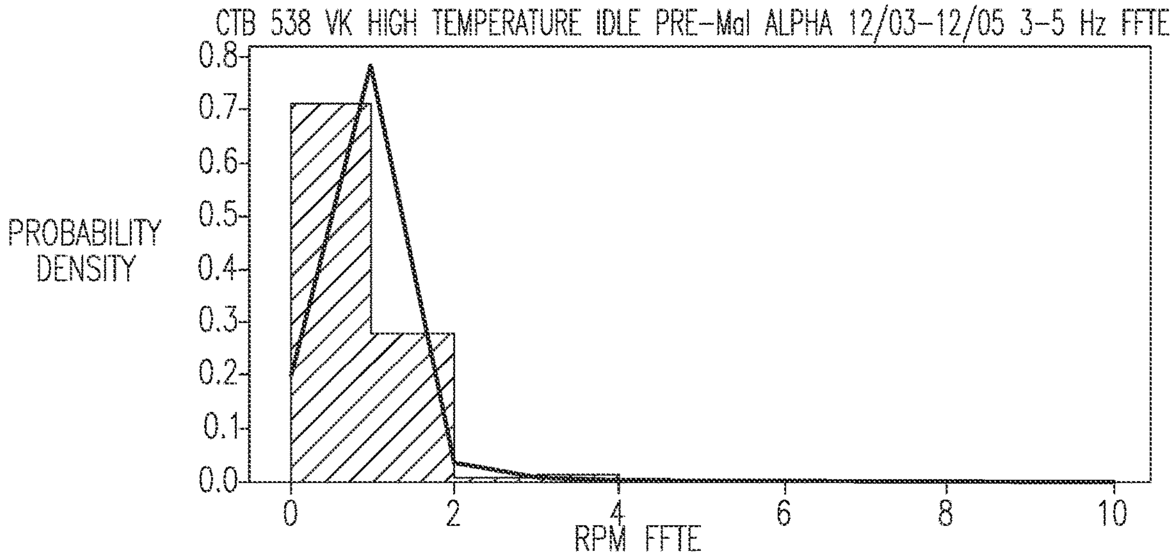
FIG. 14 is a distribution graph based off of the fast fourier transform of FIG. 13.
Figure 15:
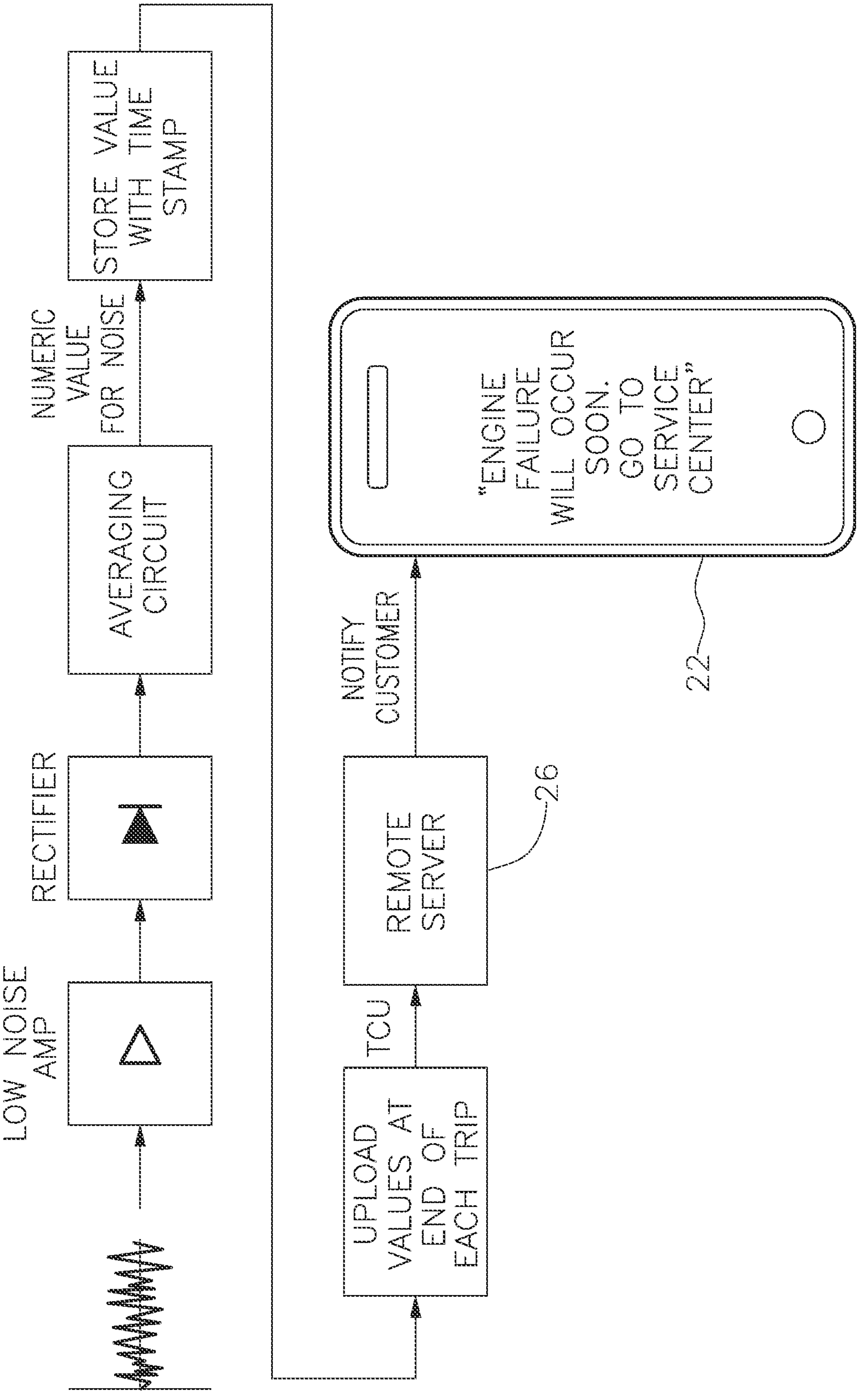
FIG. 15 is a schematic view of processing steps conducted by the engine malfunction determination system to determine engine malfunction on a remote server.

The processor of the remote server 26 is preferably programmed to aggregate a distribution of FFTE for each vehicle trip or set of trips. FIGS. 10, 12 and 14 depict samples of aggregate distributions of FFTE for the time segments of FIGS. 9, 11 and 13, respectively. The processor is further programmed to aggregate a mean and standard deviation of acquired signals over time. If the processor of the remote server 26 determines that the mean and standard deviations values change dramatically over a short period of time, the remote server 26 can inform the engine control module ECM that a malfunction is likely. Additionally, if the mean and standard deviation values of the detected signals vAFSAF reach a threshold, the remote server 26 can also notify the vehicle 12 of an impending engine failure.

In the illustrated embodiment, a predetermined threshold for the remote computing method can be a standard deviation threshold that is determined based on normal engine 14 behavior. That is, the normal mean and standard deviation values for a vehicle engine 14 behaving normally can be the predetermined standard deviation threshold.

Figure 16:
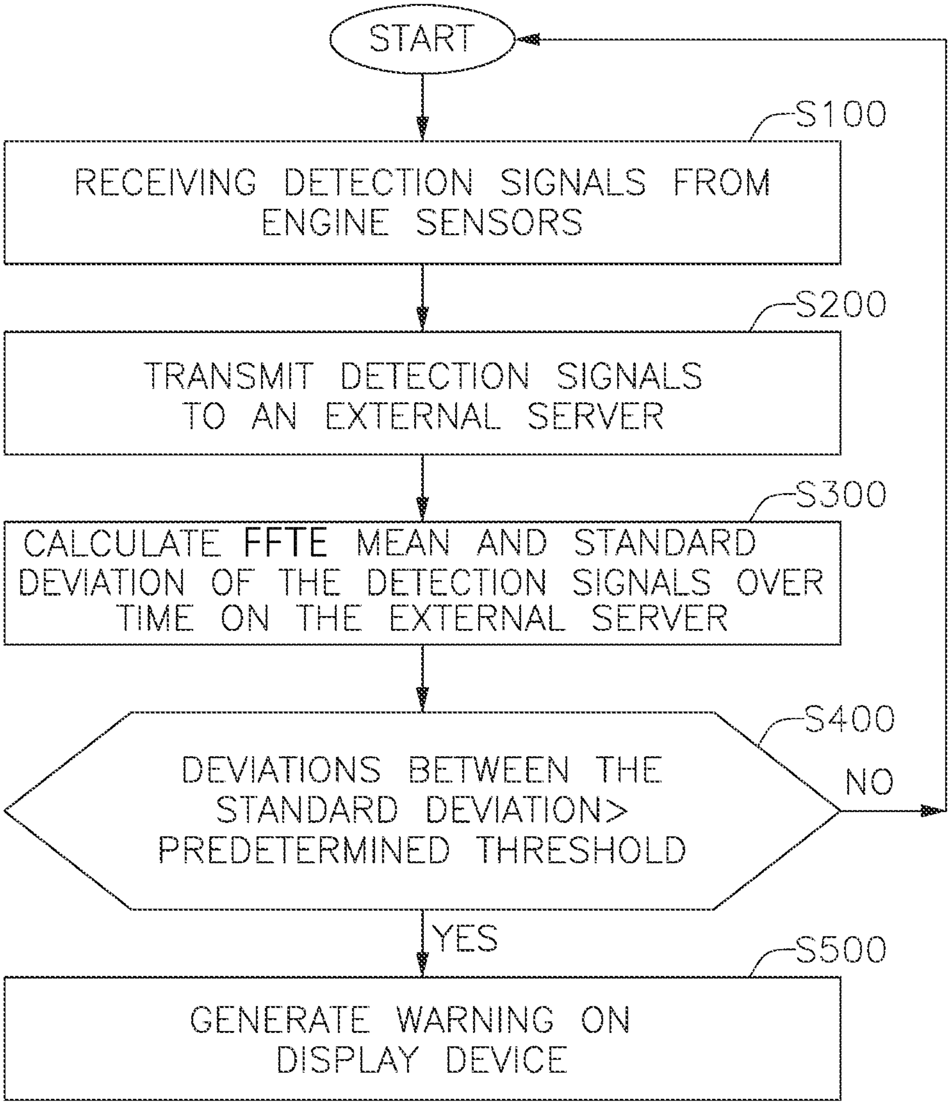
FIG. 16 is a flowchart showing a method for determining engine malfunction that can be carried out by the components of the engine malfunction determination system and a remote server.

Referring now to FIG. 16, a method for determining an engine malfunction including calculation by the remote server 26 is illustrated. The method can be carried out by the processor of the remote server 26 described herein. In step S100 the engine control module ECM receives the detection signal from the sensors 16. Alternatively, it will be apparent to those skilled in the vehicle field from this disclosure that the detection signals can be transmitted directly to the remote server 26 by the TCU. That is, in step S200, the TCU wirelessly transmits the detection signal from the engine sensor system 16 to a remote server 26 at predetermined intervals (e.g., every fifteen seconds). In step S300, the processor of the remote server 26 calculates a mean and standard deviation of the detection signals transmitted over time. In step S400, the processor of the remote server 26 determines that the standard deviation of the detection signals transmitted over time exceeds a predetermined threshold. When the processor of the remote server 26 determines yes, then the remote server 26 can send a message to the vehicle 12 to display a warning on the display device 22.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the engine malfunction determination system. Accordingly, these terms, as utilized to describe the present invention should be interpreted relative to a vehicle equipped with the engine malfunction determination system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine malfunction determination system comprising:

a vehicle engine;

an engine sensor system having at least one sensor configured to detect an operation condition of the vehicle engine;

an engine control module in electrical communication with the sensor system to receive a detection signal from the engine sensor system regarding the operation condition of the vehicle engine, the engine control module programmed to determine an anomaly in the detection signal;

an electronic display device in electrical communication with the engine control module, the electronic display device being programmed to display an indication of engine malfunction when the engine control module determines that the anomaly in the detection signal exceeds a predetermined threshold; and an electronic reference signal generator integrated with the engine control module, the electronic reference signal generator generating an electronic reference signal that is a signal having a consistent wavelength amplitude and overlaying the reference signal over the detected signal having an inconsistent wavelength amplitude, the engine control module being programmed to extract a sample portion of the electronic reference signal overlaid over the detected signal at predetermined intervals, the engine control module being further programmed to analyze the sample portion that is extracted to compare the electronic reference signal with the detection signal to determine when the detection signal deviates from the electronic reference signal.

2. The engine malfunction determination system according to claim 1, wherein the operation condition of the vehicle engine includes at least one of air-fuel ratio, idle speed, variable valve timing, and ignition timing.

3. The engine malfunction determination system according to claim 2, wherein the engine sensor system includes at least one of a mass airflow sensor, an oxygen sensor, and an air-fuel sensor.

4. The engine malfunction determination system according to claim 1, wherein the electronic reference signal generator generates the electronic reference signal and overlays the electronic reference signal over the detection signal at predetermined intervals to be processed by the engine control module.

5. The engine malfunction determination system according to claim 1, wherein the engine control module is programmed to determine the engine anomaly when the detection signal deviates from the electronic reference signal beyond the predetermined threshold.

6. The engine malfunction determination system according to claim 3, further comprising a telematic control unit electrically connecting the engine sensor system with a remote server, the telematic control unit being programmed to wirelessly transmit detection signals from the engine sensor system to the remote server at predetermined intervals.

7. The engine malfunction determination system according to claim 6, wherein the remote server is programmed to determine a mean and standard deviation of the detection signals transmitted over time.

8. The engine malfunction determination system according to claim 7, wherein the display device is programmed to display the indication of engine malfunction when the standard deviation of the detection signals exceeds a standard deviation threshold of the predetermined threshold.

9. The engine malfunction determination system according to claim 6, further comprising a vehicle equipped with the vehicle engine, the engine sensor system, the engine control module, and the telematic control unit.

10. The engine malfunction determination system according to claim 9, wherein the electronic display is programmed to display a warning indication of potential engine malfunction when the engine control module determines the anomaly in the detection signal exceeds a first predetermined threshold of the predetermined threshold.

11. The engine malfunction determination system according to claim 10, wherein the electronic display is programmed to display another warning indication of imminent engine malfunction when the engine control module determines the anomaly in the detection signal exceeds a second predetermined threshold of the predetermined threshold.

12. A method for determining a vehicle engine anomaly, the method comprising:

receiving a detection signal having an inconsistent wavelength amplitude from the engine sensor system by an engine control module in electrical communication with the sensor system;

generating a reference signal having a consistent wavelength amplitude using an electronic reference signal generator integrated with the engine control module;

overlaying the reference signal over the detected signal;

extracting a sample portion of the electronic reference signal overlaid over the detected signal at predetermined intervals; and analyzing the sample portion that is extracted to compare the electronic reference signal with the detection signal generated by the engine sensor system to determine when the detection signal deviates from the electronic reference signal.

13. The method for determining a vehicle engine anomaly according to claim 12, further comprising determining when the detection signal deviates from the overlaid electronic reference signal beyond a predetermined threshold.

14. The method for determining a vehicle engine anomaly according to claim 13, further comprising determining a potential engine malfunction by determining the anomaly in the detection signal exceeds a first predetermined threshold of the predetermined threshold.

15. The method for determining a vehicle engine anomaly according to claim 14, further comprising determining an imminent engine malfunction by determining the anomaly in the detection signal exceeds a second predetermined threshold of the predetermined threshold.

16. The method for determining a vehicle engine anomaly according to claim 12, wherein the engine sensor system includes at least one of a mass airflow sensor, an oxygen sensor, and an air-fuel sensor.

17. The engine malfunction determination system according to claim 1, wherein the reference signal injected and overlaid by the electronic reference signal generator is a pristine sinusoidal signal.

* * * * *